Oct. 15, 1946.   J. B. BLACK   2,409,245
FUEL SYSTEM
Filed Aug. 12, 1944   2 Sheets-Sheet 1

INVENTOR.
JOHN B. BLACK
BY
*Donald W. Farrington*

ATTORNEY

Oct. 15, 1946.  J. B. BLACK  2,409,245
FUEL SYSTEM
Filed Aug. 12, 1944  2 Sheets-Sheet 2

INVENTOR.
JOHN B. BLACK
BY
Donald W. Farrington
ATTORNEY

Patented Oct. 15, 1946

2,409,245

UNITED STATES PATENT OFFICE 2,409,245

FUEL SYSTEM

John B. Black, Middle River, Md., assignor to The Glenn L. Martin Company, Middle River, Md., a corporation of Maryland Application August 12, 1944, Serial No. 549,270

8 Claims. (Cl. 222—66)

This invention relates to an automatic fuel system, more particularly to the automatic pumping arrangement for the plurality of fuel tanks interconnected in the fuel system.

In any fuel storage system for an aircraft, it is common practice to have the fuel stored in several small fuel tanks located in the wings, fuselage or hulls of seaplanes or wherever such tanks can be advantageously located. In the case of wing tanks, it is common practice to have an equal number of tanks located in each wing, symmetrically about the fuselage. The tanks in one wing will furnish fuel to the engine or engines mounted on that side of the fuselage while the engines mounted on the other side of the fuselage will draw fuel from the tanks in the adjacent wing. The tanks are usually connected to a header in which is located a pump. It is usual to connect all the tanks to a selector valve which is manually or automatically moved to permit fuel to flow from a particular tank into the header under the influence of the pump. In view of the fact that the liquidometers or other devices that are intended to measure the number of gallons of fuel in a tank, are not sufficiently accurate so that it can be readily determined when the tank is about empty, coupled with the fact that due to the complexity of operating the modern airplane, it is not feasible to have the pilot or co-pilot watch the fuel gauges to see that the selector valve is manually turned to the next tank when one tank is about empty. Even with an automatic arrangement for moving the selector valve to take fuel from different tanks, due to the existing inaccuracies or lack of sensitivity in the liquid measuring devices, it is necessary that in an average long-range airplane comparable to a medium or heavy bomber that the system is so arranged that the selector valve will be operated either manually or automatically when the tank gets down to about 25 gallons. This 25 gallon low limit is necessary as a safety measure because of the reaction time of personnel to move a manual valve due to the fact that the 25 gallon fuel would flow out of the tank very rapidly under normal consumption of the engines and with the automatic system it is about the safe lower limit for the ordinary liquid-level measuring device. For this reason the present system has been developed whereby practically all the fuel in the tank can be safely used and it is not necessary to leave 25 gallons per tank of unused fuel which in a long range heavy bomber having a minimum of 10 fuel cells might mean some 250 gallons of fuel that cannot be used in the flight of the aircraft and adds some 1500 lbs. of dead load that must be carried.

By this invention a unitary liquid-level measuring and fuel pumping mechanism is provided for each tank in a system having a plurality of tanks.

Another object of the invention is the provision of an automatically operated pump in a sump located in the bottom of the tank so that all the fuel may be removed from the tank.

Another object of the invention is the provision of a liquid-level responsive device secured to the fuel pump in a sump attached to a tank for automatically controlling the pump in response to the level of the fuel in the tank.

A further object of the invention consists of an arrangement of structure whereby the liquid-level responsive device which is adapted to control the pump also indicates the gallons of fuel left in the tank on the gauge of the instrument panel.

A further object of the invention is the interconnection of a plurality of such units so that as one tank is emptied, the pump of the next tank is energized to furnish fuel to the engines.

A further object of the invention is a system of tanks and fuel pumps, so arranged that fuel will be pumped from the full tanks in sequence, and if any tank is empty for any reason, it will be skipped and fuel will be pumped from the next full tank.

Further and other objects will become apparent from the description of the accompanying drawings which form a part of this disclosure and in which like numerals refer to like parts.

Figure 1:
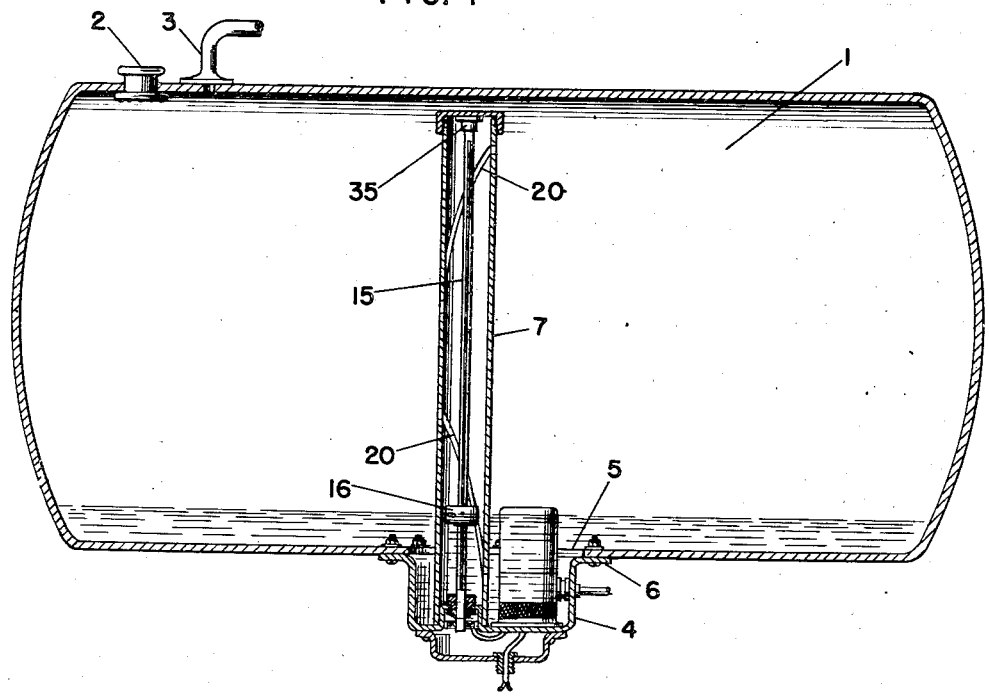
Figure 1 shows a sectional view of a fuel tank having the liquid-level and motor pump unit assembled to a sump attached to the tank.

Figure 1 of the drawings shows a fuel tank 1 having a filling cap 2 and a vent line 3 secured thereto. The sump of tank 1 is shown secured to the bottom of the tank. The bottom of the tank may be cut out as shown at 5 and a flange 6 of sump 4 secured by bolts or other fastening means about the opening 5. A more detailed description of this construction will be described in connection with Figure 3.

Figure 3:
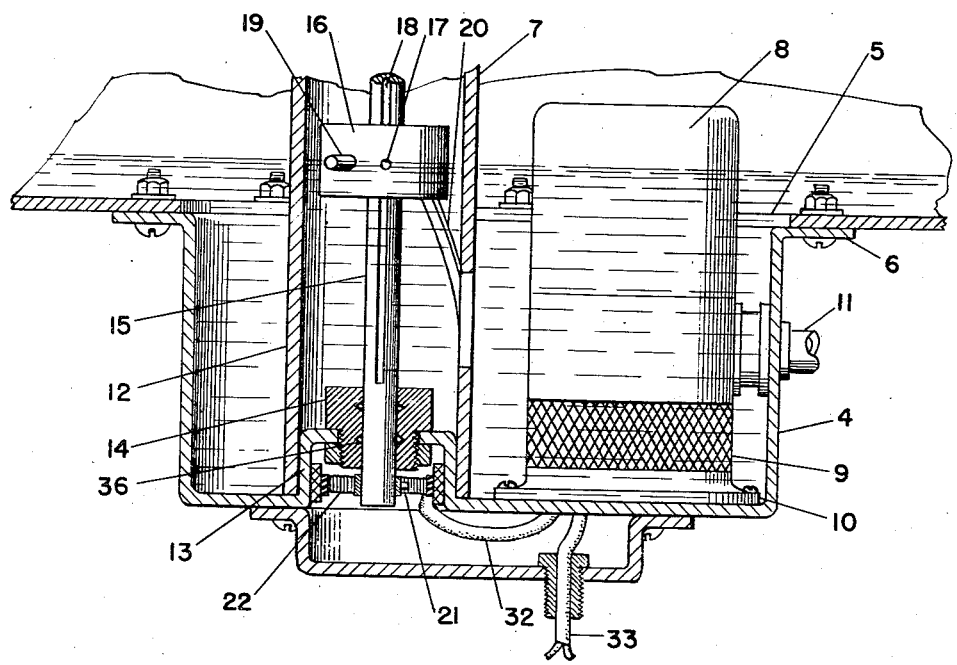
Figure 3 is a fragmentary view of the tank and sump showing the relationship of the motor pump and liquid-level responsive device.
Figure 4:
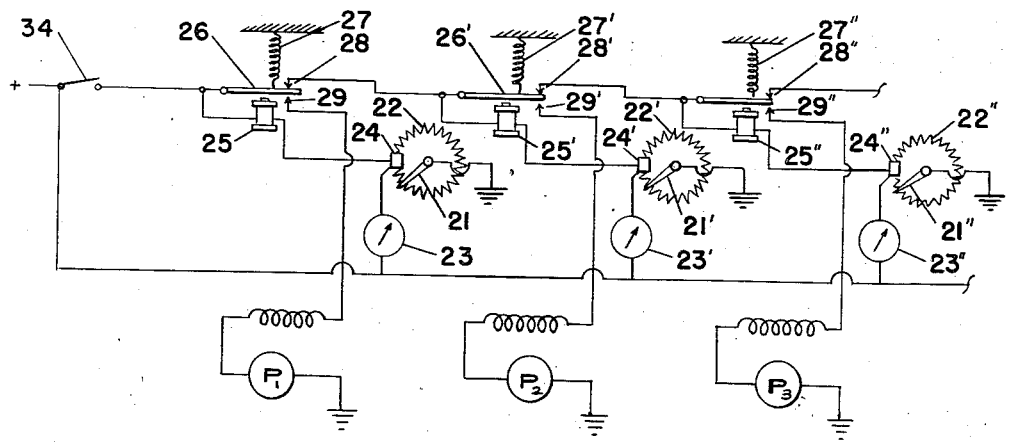
Figure 4 is a second diagram showing the interconnection of a plurality of fuel tanks for sequential operation.

The sump 4 shown in Figure 3 consists of a cup-like member formed of metal or other suitable material, adapted to be attached to the underside of a tank which will have an opening substantially equal in diameter to the diameter of the sump or at least sufficient to permit the liquid-level measuring device 7 to extend into the tank. On the bottom of sump 4 is secured a motor driven pump 8 having a screened intake 9 as close to the bottom of the motor-pump unit as is practical. This pump unit is secured by flange 10 to the base of sump 4. Delivery pipe 11 extends from the pump portion of the motor-pump unit through the wall of the sump. Also secured to the bottom of the sump is the liquid-level measuring device 7 which is housed in tube 12. This tube can be secured in any suitable manner to the wall of the sump, but as shown in Figure 3, the bottom of the sump is formed as shown at 13 so that it projects into the sump and is adapted to receive the end of the tube with a sliding fit. A fitting 14 acts as a bottom support and liquid-tight bearing for a rod 15. Float 16 is carried by rod 15 and adapted to freely move longitudinally thereof as the liquid-level in the tank varies. This is accomplished by having a loose fit between the hole in the float and the rod and having a pin 17 extend through the float into groove 18 in the rod. The upper end of rod 15 is freely pivoted at bearing 35. A pair of diametrically opposite pins, one of which is shown at 19, are mounted in the sides of float 16 and extend through a pair of helical slots 20 in the wall of tube 12. By this arrangement, it is readily seen that as the float moves along the tube due to the variation in the level of the liquid in the tube, the float will move axially of rod 15 and at the same time rotate due to the pins 19 sliding in helical slots 20. The end of shaft 15 extends through fitting 14 and turns freely therein but is maintained in a sealed liquid-tight relation thereto by O-ring seals in V-grooves 36. To the end of shaft 15 extending into the sump through fitting 14 is a sliding contactor 21 which slides on rheostat 22. This rheostat is so connected to a meter shown as 23 in Figure 4 that it will indicate the position of the float along shaft 15 and the meter can be calibrated to read the gallons of liquid in the tank. An insulated section 24 at the end of the rheostat 22 is arranged as shown in Figure 4 to control solenoid 25 to stop motor-pump unit 8 when the float drops below the bottom of the tank into the sump. When the motor unit is thus stopped, the relay armature 26 will be moved upwardly under the influence of spring 27 to cause contact 28 to energize the circuit of the motor-pump unit of the next tank, contact 29 of the pump of the first tank being broken when the solenoid 25 is de-energized when contact 21 comes to rest on section 24. It can readily be seen that the motor-pump unit of the second tank, P2, will then pump fuel into the fuel line until the float 16 of its liquid-leveling device falls below the bottom of the tank and into the sump at which time the motor-pump unit of the next tank will be energized. While the liquid-level measuring device illustrated has been described in detail, it is to be understood that any type of liquid-level measuring device that can be adapted electrically or mechanically to operate the selector switch may be employed.

Figure 2:
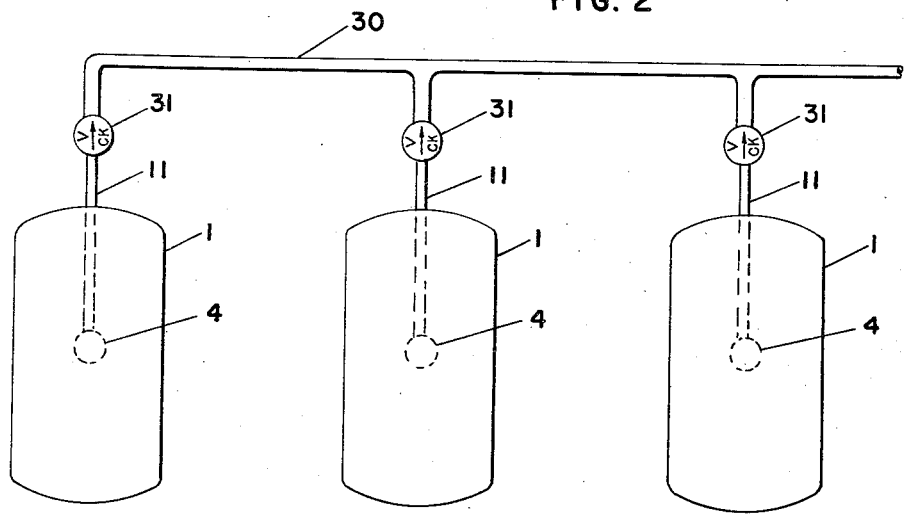
Figure 2 shows an arrangement of a plurality of tanks attached to a header.

The general arrangement of tanks is shown in Figure 2. Tanks 1 each have a sump 4 and a fuel line 11 extending from the sump to a header 30. Check valves 31 are inserted in lines 11 to prevent fuel from backing up into empty tanks. While wires 32 and 33 are shown interconnecting the rheostat and the control mechanism in the motor-pump unit and this mechanism connected to a source of power, it is obvious that the manner of electrically connecting the rheostat relay and motor of the pump is optional and can be accomplished in any conventional manner. To facilitate installation, it is preferred that the relay be incorporated in the motor-pump unit so that a single lead to the rheostat is all that is necessary. This renders very simple the maintenance of this unit.

When switch 34 is closed, solenoid 25 will cause armature 26 to complete the circuit through contact 29 to pump $P_1$. The motor-pump unit of the first tank will operate while the float falls with the level of the liquid in the tank into the sump. Gauge 23 being connected to the rheostat 22 will indicate the movement of float 16 down the shaft 15 as liquid-level falls and thus at anytime the number of gallons in the tank may be readily determined. When contact 21 reaches section 24, the solenoid 25 will be de-energized and armature 26 under the influence of spring 27 will complete the circuit of solenoid 25' of the motor-pump unit of the second tank $P_2$ which will proceed in a similar manner to empty the fuel from the second tank and when the float of this tank falls into the sump the next tank will be energized.

The location of the pump in the sump is not essential as the pump may be mounted inside or outside the sump on the tank or near the tank, in any manner that affords a compact arrangement with a minimum of vertical space. The inlet of the pump should be located close to the bottom of the sump below the level of the tank. The end of the float mechanism or the equivalent liquid-level measuring device must be in the sump so that the motor of the pump will be cut off when the liquid-level drops into the sump.

It is to be understood that certain changes, alterations, modifications and substitutions can be made without departing from the spirit and scope of the appended claims.

I claim as my invention:

1. A plurality of liquid storage tanks each having a sump formed therein, an electrically controlled pump for each of said tanks mounted in said sump, having the inlet thereof in said sump below the bottom of the tank, a liquid-level responsive switch adapted to maintain the circuit of the pump closed until the liquid level drops below the bottom of the tank, and a relay connected in the electric control circuits of said pumps actuated by said switch, whereby, when one tank is substantially emptied, the pump of the next full tank is energized.

2. A plurality of liquid storage tanks each having a sump formed therein, a pump for each of said tanks mounted in said sump having the inlet thereof in the sump, below the bottom of said tanks, means in said sump responsive to the level of the liquid in a tank to stop the pump when the liquid level falls into said sump, and means actuated upon the stoppage of said pump to energize the pump of the next full tank.

3. A liquid storage system comprising a plurality of storage tanks connected to a pipeline, each tank having a sump formed therein, individual pump means for each tank mounted in said sump to withdraw liquid from the sumps of each said tank, and deliver it to said pipeline, switch means in each tank actuated by the liquid level in each tank, said switch means operating control means so that when the liquid in the tanks reaches a predetermined level, the switch means will cause the pump of that tank to be de-energized and the pump of the next full tank in the system to be energized.

4. A plurality of liquid storage tanks each having a sump formed therein, an electrically controlled pump for each of said tanks having the inlet thereof in said sump, below the bottom of the tank, a liquid-level responsive switch adapted to maintain the circuit of the pump closed until the liquid level drops below the bottom of the tank, and a relay connected in the electric control circuits of said pumps actuated by said switch, whereby, when one tank is substantially emptied, the pump of the next full tank is energized.

5. A plurality of liquid storage tanks each having a sump formed therein, a pump for each of said tanks having the inlet thereof in the sump, below the bottom of said tanks, means in said sump responsive to the level of the liquid in a tank to stop the pump when the liquid level falls into said sump, and means actuated upon the stoppage of said pump to energize the pump of the next full tank.

6. A liquid storage system comprising a plurality of storage tanks connected to a pipeline, each tank having a sump formed therein, individual pump means for each tank to withdraw liquid from the sumps of each said tank, and deliver it to said pipeline, switch means in each tank actuated by the liquid level in each tank, said switch means operating control means so that when the liquid in the tanks reaches a predetermined level, the switch means will cause the pump of that tank to be de-energized and the pump of the next full tank in the system to be energized.

7. An automatic fuel pump unit adapted to be secured over an aperture on the lower side of a fuel tank comprising a housing forming a sump for the tank, a motor pump unit having the pump intake adjacent the bottom wall of said housing, the delivery pipe of said pump extending through a wall of said housing, a liquid level measuring unit mounted on said housing member which extends through the opening in the bottom wall of the tank to a point adjacent the top of the tank, said liquid level measuring unit having means associated therewith to keep the motor circuit closed until the liquid level falls below the bottom of the tank.

8. In combination with a fuel storage tank having an aperture in the bottom thereof, a fuel pump unit comprising a housing adapted to be mounted on said tank forming a sump, said housing having a motor pump unit mounted on the lower wall thereof with a fuel inlet to the pump located adjacent the bottom of the housing and a fuel discharge extending from the pump through the wall of the housing, a liquid level measuring device supported on said housing and extending through the aperture in the tank to a point adjacent the top of the tank, said liquid level measuring device consisting of a rheostat and switch mechanism adapted to be actuated by a float means in said liquid level measuring device, said rheostat and switch means adapted to be connected into the motor control unit to cut off the motor when the liquid level drops into said pump.

JOHN B. BLACK.